US011760300B1

(12) United States Patent
Jaradi et al.

(10) Patent No.: US 11,760,300 B1
(45) Date of Patent: Sep. 19, 2023

(54) FLOOR-MOUNTED AIRBAG BETWEEN PASSENGER AND CARGO COMPARTMENTS

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/751,710

(22) Filed: May 24, 2022

(51) Int. Cl.
*B60R 21/231* (2011.01)
*B60R 21/2338* (2011.01)
(Continued)

(52) U.S. Cl.
CPC ........ *B60R 21/2338* (2013.01); *B60R 21/026* (2013.01); *B60R 21/20* (2013.01); *B60R 21/231* (2013.01); *B60R 21/0136* (2013.01); *B60R 2021/0266* (2013.01); *B60R 2021/168* (2013.01); *B60R 2021/23153* (2013.01); *B60R 2021/23161* (2013.01); *B60R 2021/23386* (2013.01)

(58) Field of Classification Search
CPC ..... B60R 21/214; B60R 21/01; B60R 21/231; B60R 21/2338; B60R 21/026; B60R 21/02; B60R 21/0136; B60R 21/20; B60R 21/213; B60R 21/06; B60R 21/08; B60R 2021/01211; B60R 2021/01252; B60R 2021/01286; B60R 2021/23153; B60R 2021/23386; B60R 2021/0266; B60R 2021/23161; B60R 2021/0273; B60R 2021/168; B60R 2021/0253; B60R 2021/2173; B60R 2021/0293; B60R 2021/0407; B60R 5/04; B60N 2/90; B60N 2/919
USPC ......... 280/730.1, 743.2, 728.1, 728.2, 743.1, 280/748, 749, 751, 753; 410/119; 180/271, 274; 296/24.43
See application file for complete search history.

(56) References Cited

U.S. PATENT DOCUMENTS 5,085,382 A * 2/1992 Finkenbeiner ........... B64D 9/00
188/371
6,004,084 A * 12/1999 Moker .................. B60R 21/207
410/117
(Continued)

FOREIGN PATENT DOCUMENTS

DE 4322936 A1 * 1/1995 ........... B60R 21/026
DE 102007017998 A1 * 10/2008 ........... B60R 21/207
(Continued)

*Primary Examiner* — Keith J Frisby
(74) *Attorney, Agent, or Firm* — Frank A. MacKenzie; Bejin Bieneman PLC

(57) ABSTRACT

A vehicle includes a vehicle body defining an interior cabin. The interior cabin includes a passenger compartment and a cargo compartment. The vehicle body includes a floor below the interior cabin. An airbag is supported on the floor and is inflatable upwardly from the floor between the passenger compartment and the cargo compartment. A retractor is fixed to the vehicle body above the airbag. A tether extends from the retractor to the airbag.

16 Claims, 5 Drawing Sheets

(51) Int. Cl.
   *B60R 21/20* (2011.01)
   *B60R 21/02* (2006.01)
   B60R 21/0136 (2006.01)
   B60R 21/16 (2006.01)

(56) References Cited

U.S. PATENT DOCUMENTS

| | | | |
|---|---|---|---|
| 9,296,351 B1 | 3/2016 | Madrigal Medina et al. | |
| 9,637,078 B2 | 5/2017 | Bull | |
| 9,744,932 B1 | 8/2017 | Faruque et al. | |
| 10,336,275 B2 | 7/2019 | Sundararajan et al. | |
| 10,919,478 B2 | 2/2021 | O'Connor et al. | |
| 2019/0315304 A1* | 10/2019 | Chen | B60R 21/2338 |
| 2022/0097640 A1* | 3/2022 | Yetukuri | B60R 21/02 |
| 2022/0203923 A1* | 6/2022 | Jaradi | B60R 21/264 |

FOREIGN PATENT DOCUMENTS

| | | | |
|---|---|---|---|
| DE | 102007026366 A1 * | 12/2008 | B60R 21/08 |
| DE | 202009015507 U1 * | 7/2010 | A01K 1/0272 |
| EP | 1110808 A1 * | 6/2001 | B60N 2/4221 |
| JP | H11198699 A * | 7/1999 | |
| JP | 2006224807 A * | 8/2006 | |
| JP | 2006273151 A * | 10/2006 | |
| JP | 2020044927 A * | 3/2020 | |
| KR | 0171344 B1 * | 2/1999 | |
| KR | 100993032 B1 | 11/2010 | |

* cited by examiner

FLOOR-MOUNTED AIRBAG BETWEEN PASSENGER AND CARGO COMPARTMENTS

BACKGROUND

A vehicle may include a designated space to stow cargo during operation of the vehicle, i.e., a cargo compartment. Such vehicles may be passenger vehicles and/or delivery vehicles. As one example, the cargo compartment may be separate from a passenger compartment. As another example, the cargo compartment may be open to the passenger compartment. The passenger compartment includes at least one seat vehicle-forward of the cargo compartment. The vehicle may, for example, include a liftgate, back door, etc., providing access to load cargo into and unload cargo from the cargo compartment.

In examples in which the cargo compartment is open to the passenger compartment, the passenger compartment may end and the cargo compartment may begin behind a rearmost seat. In such examples, cargo may be loaded into the cargo compartment, e.g., through the liftgate, back door, etc., up to the rearmost seat.

DETAILED DESCRIPTION

Figure 1:
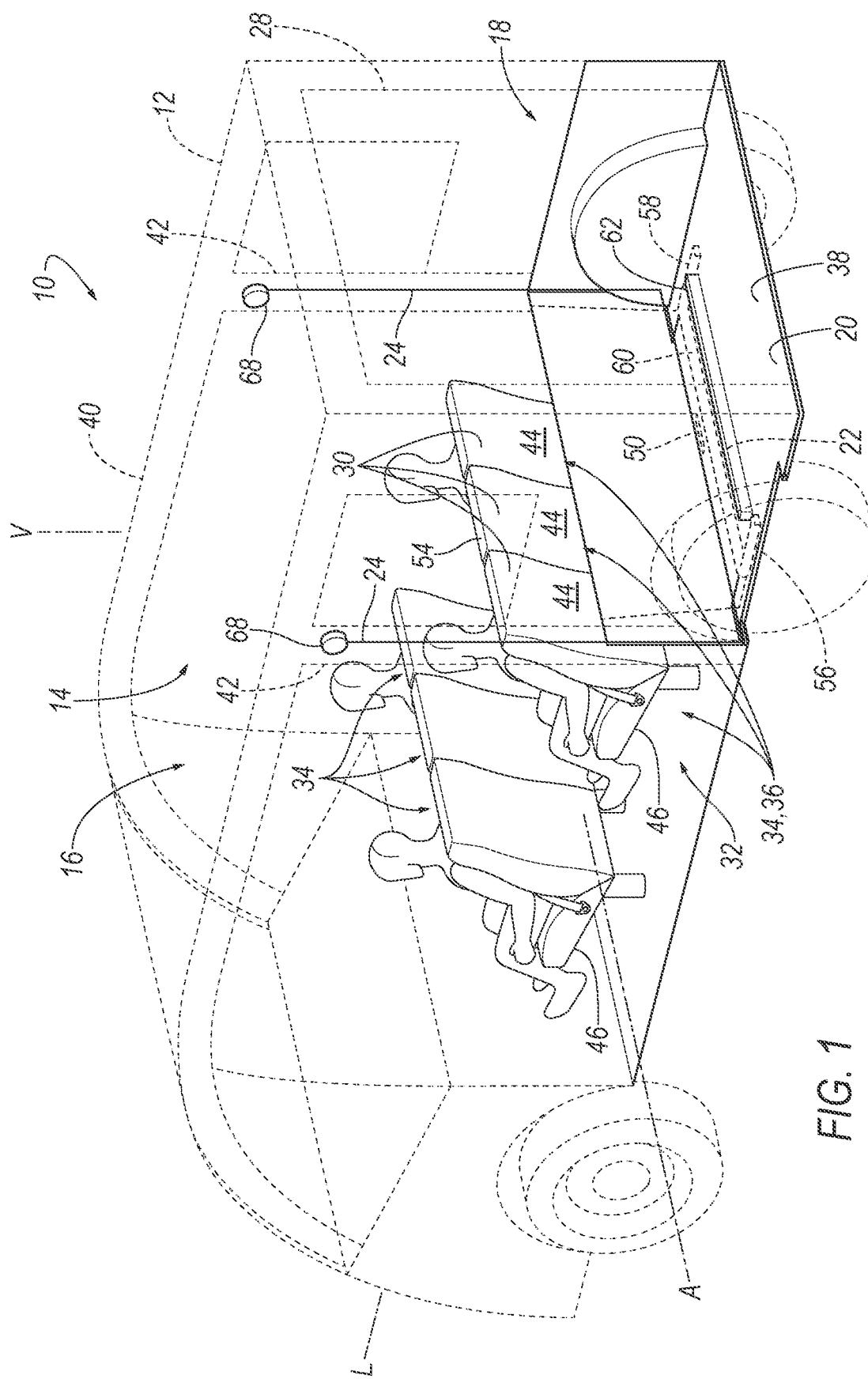
FIG. 1 is a perspective view of a vehicle with an airbag between an occupant compartment and a cargo compartment in an uninflated position.

A vehicle includes a vehicle body defining an interior cabin. The interior cabin includes a passenger compartment and a cargo compartment. The vehicle body includes a floor below the interior cabin. An airbag is supported on the floor and is inflatable upwardly from the floor between the passenger compartment and the cargo compartment. A retractor is fixed to the vehicle body above the airbag and a tether extends from the retractor to the airbag.

A protrusion may extend upwardly from the floor between the airbag and the cargo compartment. The protrusion may be elongated cross-vehicle. A seat may have a back facing vehicle-rearward, in such an example, the airbag is between the back of the seat and the protrusion. The protrusion may be designed to prevent cargo from sliding vehicle-forward along the floor over the airbag. The airbag may extend above the protrusion in the inflated position.

A seat may include a seatback, in such an example, the retractor may be fixed to the vehicle body above an uppermost top of the seatback. The vehicle body may include a pillar adjacent the seat, in such an example, the retractor may be fixed to the pillar. The seat may be elongated cross-vehicle and may include a plurality of occupant-seating areas.

A seat may include a seatback, in such an example, an uppermost top of the airbag in the inflated position may be above an uppermost top of the seatback.

The vehicle body may include a pillar, in such an example, the retractor may be fixed to the pillar.

The airbag may include a left side, a right side, and a middle portion between the left side and the right side, in such an example, the middle portion may be elongated cross-vehicle and the left side, and the right side may extend vehicle-rearward from the middle portion.

The floor may include upholstery and the airbag in an uninflated position is below the upholstery.

A vehicle includes a vehicle body defining an interior cabin, the interior cabin includes a passenger compartment and a cargo compartment. The vehicle body includes a floor below the interior cabin. An airbag is on the floor and is inflatable upwardly from the floor between the passenger compartment and the cargo compartment. A retractor is fixed to the vehicle body above the airbag and operatively connected to the airbag to pull the airbag upwardly.

A protrusion may extend upwardly from the floor between the airbag and the cargo compartment. The protrusion is elongated cross-vehicle.

With reference to the Figures, wherein like numerals indicate like parts throughout the several views, a vehicle 10 includes a vehicle body 12 defining an interior cabin 14. The interior cabin 14 includes a passenger compartment 16 and a cargo compartment 18. The vehicle body 12 includes a floor 20 below the interior cabin 14. An airbag 22 is supported on the floor 20 and is inflatable upwardly from the floor 20 between the passenger compartment 16 and the cargo compartment 18. A retractor 68 is fixed to the vehicle body 12 above the airbag 22. A tether 24 extends from the retractor 68 to the airbag 22.

Since the airbag 22 inflates upwardly from the floor 20 between the passenger compartment 16 and the cargo compartment 18, the airbag 22 may retain cargo in the cargo compartment 18 in the event of a vehicle impact, rollover, etc. In addition, the retractor 68 pulls the airbag 22 upwardly via the tether 24 to decrease deployment time of the airbag 22 and to add to containment of the cargo in the cargo compartment 18. The airbag 22 being supported on the floor 20 in an uninflated position is beneficial for packaging.

The vehicle 10 may be any suitable type of automobile including a passenger vehicle or a commercial vehicle. The vehicle 10 may be, for example, a sedan, a coupe, a truck, a sport utility vehicle, a crossover vehicle, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

With reference to FIG. 1, the vehicle 10 defines a vehicle-longitudinal axis L extending between a front end (not numbered) and a rear-end (not numbered) of the vehicle 10. The vehicle 10 defines a vehicle-lateral axis A extending cross-vehicle 10 from one side to the other side of the vehicle 10. The vehicle 10 defines a vertical axis V extending through the floor 20 and a ceiling 40 of the vehicle 10. The vehicle-longitudinal axis L, the vehicle-lateral axis A, and the vertical axis V are perpendicular relative to each other.

The vehicle 10 includes a vehicle body 12 and a vehicle frame (not numbered). The vehicle body 12 may be of a unibody construction in which the frame is unitary with the vehicle frame. As another example, the vehicle body 12 and the vehicle frame may have a body-on-frame construction (also referred to as a cab-on-frame construction) in which the vehicle body 12 and vehicle frame are separate components, i.e., are modular, and the vehicle body 12 is supported on and affixed to the vehicle frame. Alternatively, the vehicle body 12 the vehicle frame may have any suitable construction. The vehicle body 12 and vehicle frame may be of any suitable material, for example, steel, aluminum, and/or fiber-reinforced plastic, etc.

The vehicle body 12 defines the interior cabin 14. The interior cabin 14 extends across the vehicle 10, i.e., from one side of the vehicle 10 to the other side of the vehicle 10. The interior cabin 14 includes a front end and a rear end with the front end being in front of the rear end during forward movement of the vehicle 10. The interior cabin 14 includes the passenger compartment 16 and the cargo compartment 18. The passenger compartment 16 is at the front end of the interior cabin 14 and the cargo compartment 18 is at the rear end of the interior cabin 14.

The passenger compartment 16 houses occupants, if any, of the vehicle 10. The passenger compartment 16 may extend across the vehicle 10, i.e., from one side to the other side of the vehicle 10. The passenger compartment 16 may include a front end and a rear end. The vehicle 10 may include an instrument panel at the front end of the passenger compartment 16.

Figure 2:
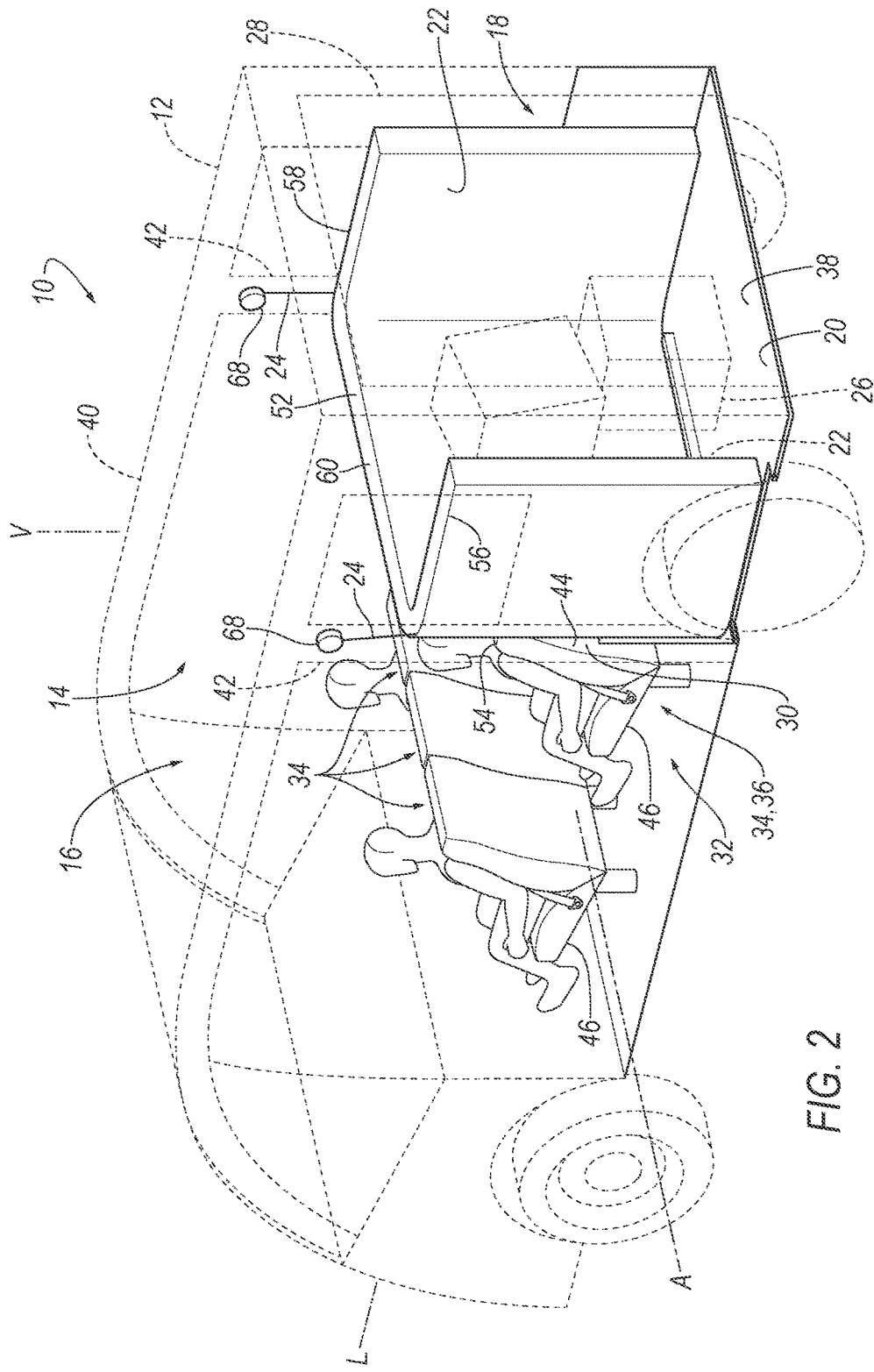
FIG. 2 is the perspective view of FIG. 1 with the airbag in an inflated position.
Figure 3:
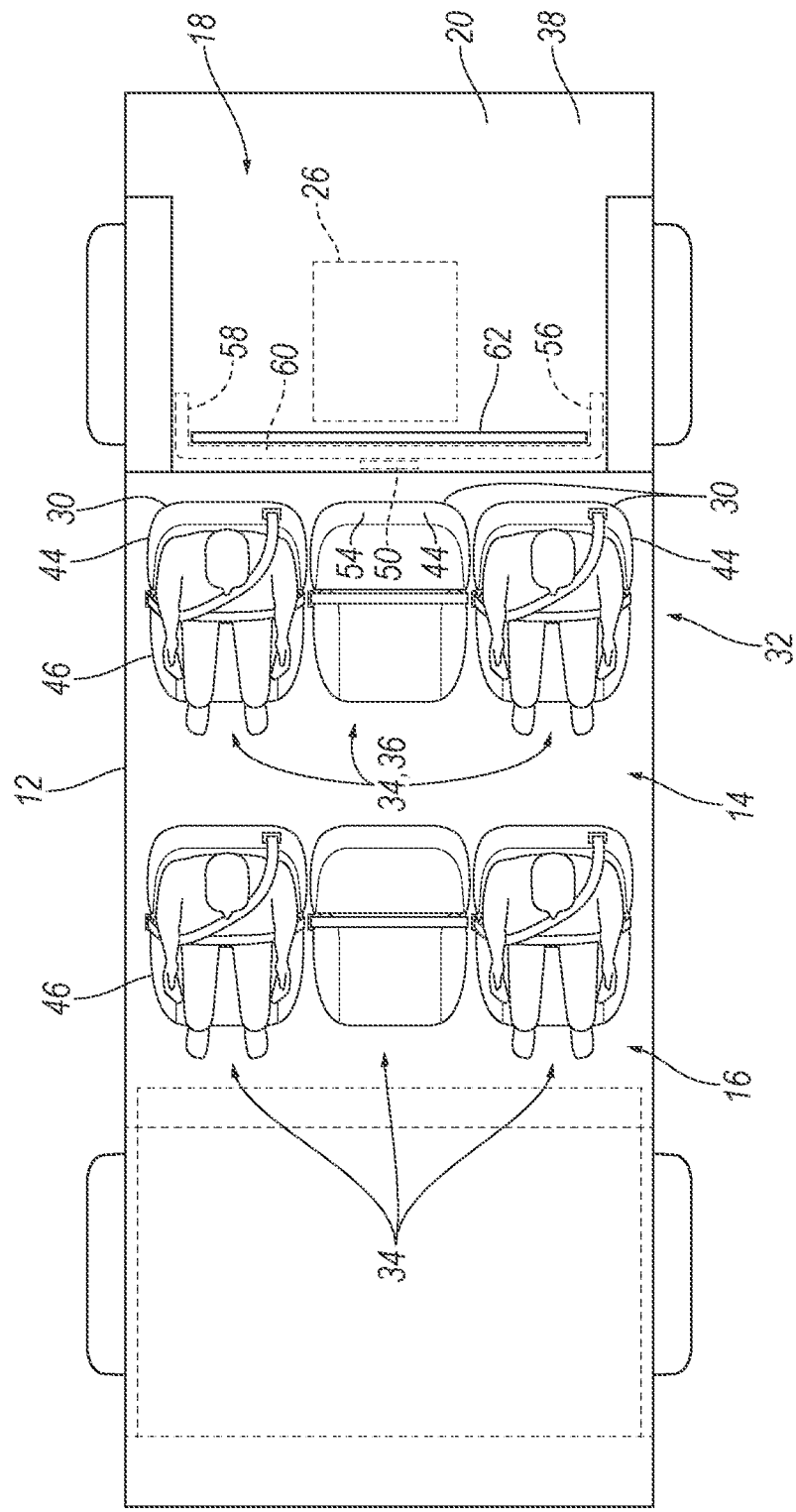
FIG. 3 is a top view of the vehicle.
Figure 4:
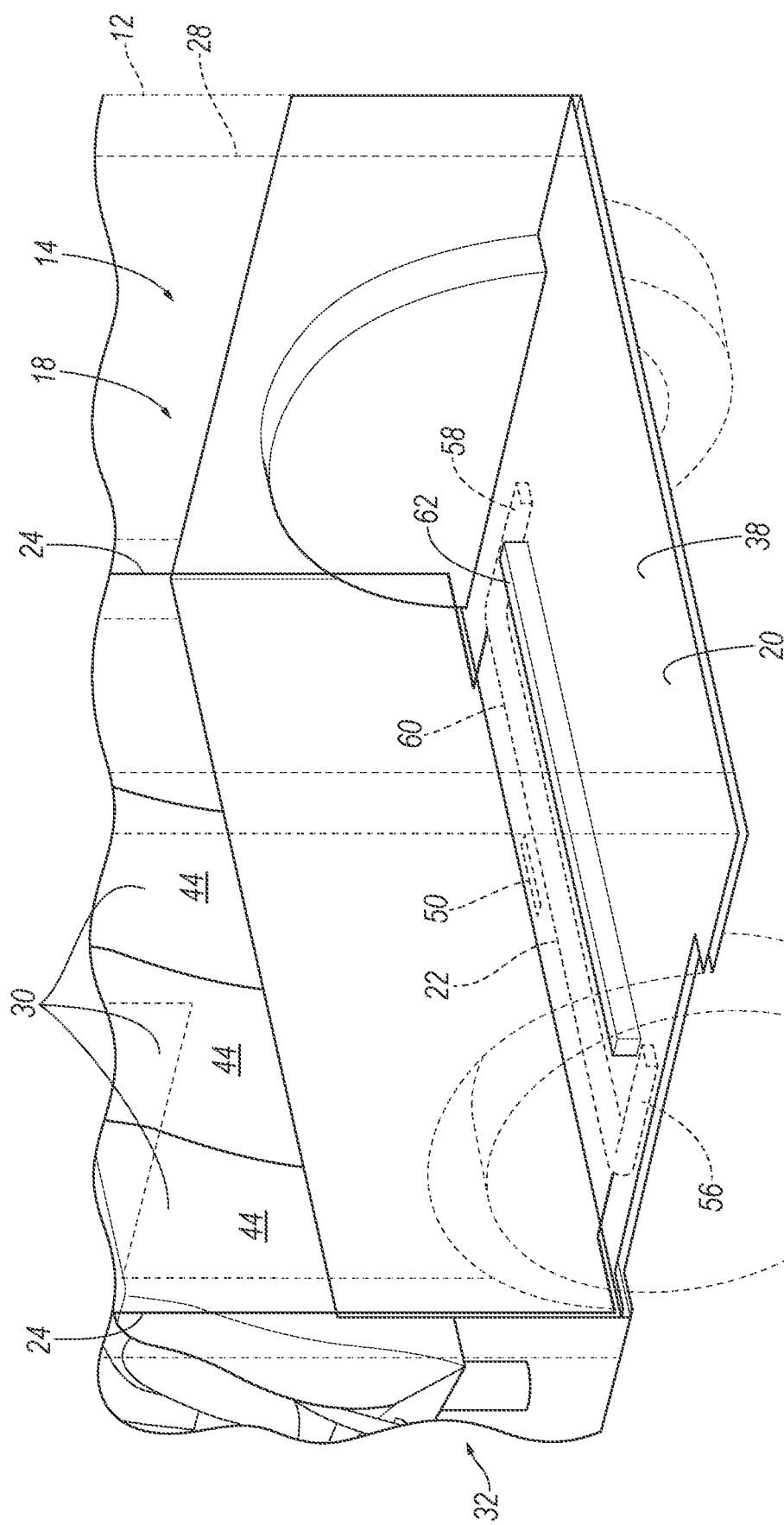
FIG. 4 is a magnified view of a portion of FIG. 1.
Figure 5:
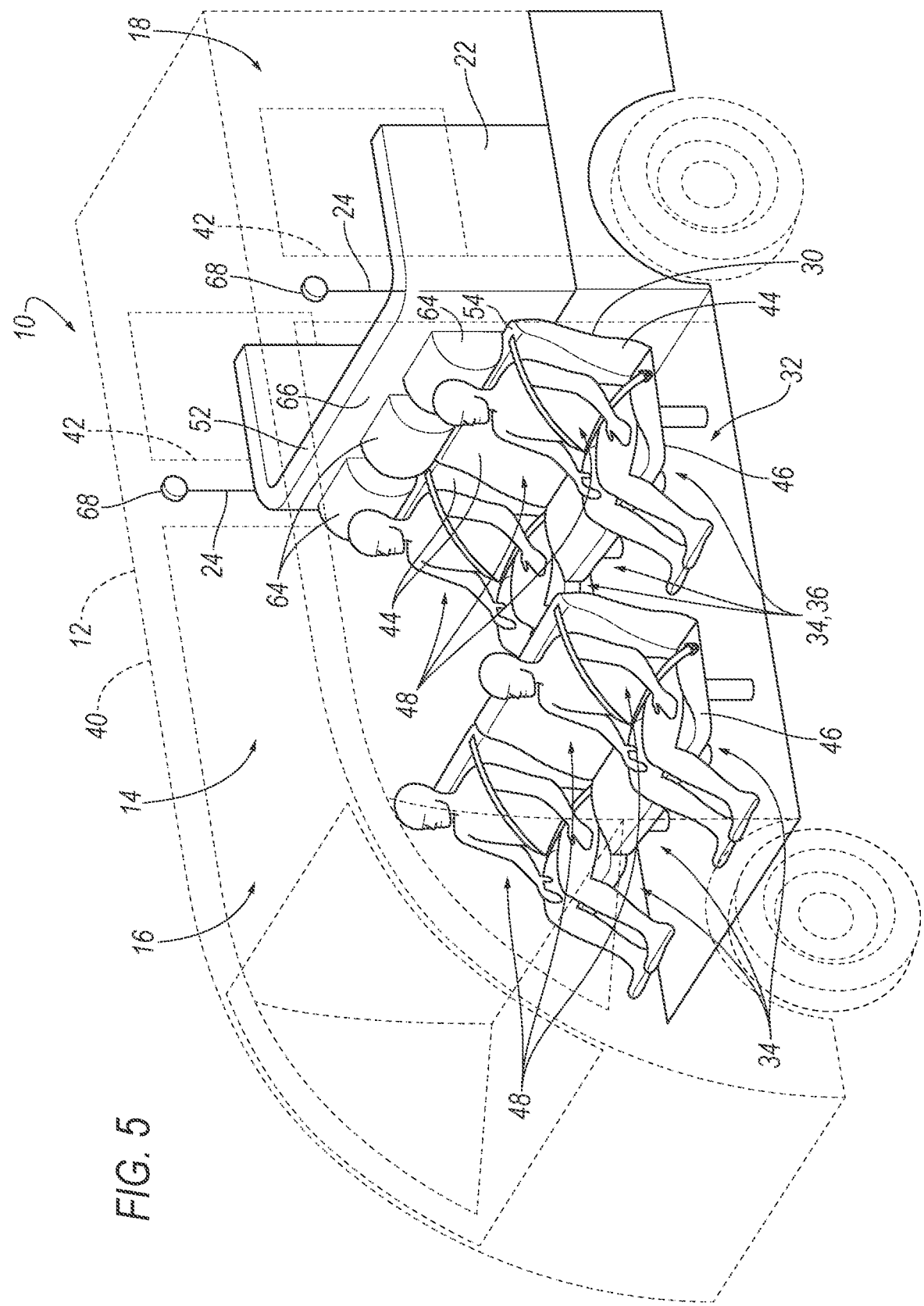
FIG. 5 is a perspective view of the vehicle with an example of the airbag in the inflated position.

The cargo compartment 18 is designed to stow cargo, if any, in the vehicle 10. Cargo may include luggage, packages, objects being transported in the vehicle 10, etc. An example of cargo 26 is shown in FIGS. 2 and 3. The cargo compartment 18 may extend across the vehicle 10, i.e., from one side to the other side of the vehicle 10. The cargo compartment 18 may include a front end and a rear end. The vehicle 10, specifically the vehicle body 12, may include a liftgate 28 or a rear door (not shown) at the rear end of the cargo compartment 18. The front end of the cargo compartment 18 may be at a back 30 of a rearmost row 32 of seats, as shown in the example in the Figures. In the example shown in the Figures the cargo compartment 18 extends from the liftgate 28 to the back 30 of the rearmost row 32 of seats and the passenger compartment 16 extends from the rearmost row 32 of seats to the instrument panel and front windshield.

The passenger compartment 16 and the cargo compartment 18 are adjacent each other. As shown in the example in the Figures, the rear end of the passenger compartment 16 is adjacent the front end of the cargo compartment 18. The passenger compartment 16 and the cargo compartment 18 are open to each other when the airbag 22 is in the uninflated position. In other words, an occupant can reach from the passenger compartment 16 into the cargo compartment 18, cargo may be passed from the passenger compartment 16 to the cargo compartment 18 and vice-versa, etc. In the example shown in the Figures, the cargo compartment 18 extends from the liftgate 28 to the back 30 of the rearmost row 32 of seats.

The passenger compartment 16 and the cargo compartment 18 may be adjustable relative to each other. In other words, the interior cabin 14 may be configurable to adjust the size of the passenger compartment 16 and the cargo compartment 18, relative to each other. As described further below, the vehicle 10 includes seats 30. As an example, the vehicle 10 may have a rear seat 36. The rear seat 36 may be adjustable, e.g., foldable to a stowed position or removeable. In an upright position, an occupant can occupy the seat 34. In the folded position, a back 30 of a seatback 44 defines a lower boundary of the interior cabin 14. When the rear seat 36 is in the upright position, the portion of the interior cabin 14 with the rear seat 36 is the passenger compartment 16. When the rear seat 36 is in the folded, the same portion of the interior cabin 14 is the cargo compartment 18.

The vehicle body 12 includes the floor 20 and may include a ceiling 40. The floor 20 defines a lower boundary of the interior cabin 14, i.e., the floor 20 is below the interior cabin 14. The floor 20 may, for example, include a metal pan and may be covered by upholstery, e.g., carpeting, facing the interior cabin 14. The floor 20 supports the seats 30 of the vehicle 10, described further below. The ceiling 40 defines an upper boundary of the interior cabin 14, i.e., the ceiling 40 is above the interior cabin 14.

The vehicle body 12 may include pillars 42. For example, the vehicle body 12 may include an A-pillar and a B-pillar on each side of the vehicle 10. The A-pillars may extend between the windshield and the front doors. In other words, the A-pillars may be disposed at the front end of the passenger cabin. The B-pillars may extend behind the front doors, e.g., between adjacent doors. In other words, the B-pillars may be spaced from the A-pillars by a front door opening. The vehicle 10 may include additional pillars, e.g., C-pillars, and D-pillars. The pillars 42 may extend from the ceiling 40 to the floor 20.

The vehicle 10 includes one or more seats 30 in the interior cabin 14. The vehicle 10 12 may include any suitable number of seats 30. The seats 30 may be arranged in the passenger cabin in any suitable position, i.e., as front seats, rear seats 32, etc. In the example shown in the Figures, the seats 30 are arranged in a front row, a second row, and a third row (i.e., a rearmost row 32 in this example). In examples including rows of seats, the vehicle 10 may include any suitable number of rows. The seats 30 may be of any suitable type, e.g., a bucket seat, bench seat, etc. In examples in which the seat 34 is a bench seat, the seat 34 is elongated cross-vehicle 10 and includes a plurality of seats 30, i.e., defines a plurality of occupant-seating areas 48, arranged cross-vehicle 10. In the example shown in the Figures, the vehicle 10 includes two bucket seats in the front row, and a bench seat in the second row, and a bench seat in the rearmost row 32.

The seat 34 includes the seatback 44 and a seat bottom 46. The seatback 44 may be supported by the seat bottom 46 and may be stationary or movable relative to the seat bottom 46. The seatback 44 and the seat bottom 46 may be adjustable in multiple degrees of freedom. Specifically, the seatback 44 and the seat bottom 46 may themselves be adjustable, in other words, adjustable components within the seatback 44 and/or the seat bottom 46, and/or may be adjustable relative to each other.

The seatback 44 may include a seatback frame (not shown) and a covering (not numbered) supported on the seatback frame. The seatback frame may include tubes, beams, etc. Specifically, the seatback frame includes a pair of upright frame members. The upright frame members are elongated, and specifically, are elongated in a generally upright direction when the seatback 44 is in a generally upright position. The upright frame members are spaced from each other and the seatback frame includes cross-members (not shown) extending between the upright frame members. The seatback frame, including the upright frame members, may be of any suitable plastic material, e.g., carbon fiber reinforced plastic (CFRP), glass fiber-reinforced semi-finished thermoplastic composite (organosheet), etc. As another example, some or all components of the seatback frame may be formed of a suitable metal, e.g., steel, aluminum, etc.

The covering may include upholstery and padding. The upholstery may be cloth, leather, faux leather, or any other suitable material. The upholstery may be stitched in panels around the frame. The padding may be between the covering and the seatback frame and may be foam or any other suitable material.

The seatback 44 may define at least one occupant-seating area 48. The occupant-seating area 48 is the space occupied by an occupant properly seated on the seat 34. The occupant-seating area 48 is seat-forward of the seatback 44 and above the seat bottom 46. In examples in which the seat 34 is a bucket seat, the bucket seat defines one occupant-seating area 48. As set forth above, in examples in which the seat 34 is a bench seat, the bench seat defines a plurality of occupant-seating areas 48 arranged cross-vehicle 10.

In some examples, at least one seat 34 may be adjacent one of the pillars 42. In the example shown in the Figures, the rear seat 36 in the rearmost row 32 is adjacent the pillar 42. Specifically, the rear seat 36 in the rearmost row 32 is adjacent the pillars 42 that support the retractors 68, as described further below.

The vehicle 10 includes an airbag 22 assembly including the airbag 22. The airbag 22 assembly includes an inflator 50 and may include a housing. The inflator 50 inflates the airbag 22 to the inflated position, as described further below. In examples including the housing, the housing houses the airbag 22 in the uninflated position and supports the airbag 22 in the inflated position. The airbag 22 may be rolled and/or folded to fit within the housing in the uninflated position. The housing may be of any suitable material, e.g., a rigid polymer, a metal, a composite, or a combination of rigid materials. The airbag housing may, for example, include clips, threaded fasteners, etc., for attaching the housing to the floor 20.

The airbag 22 is supported on the floor 20. In other words, the weight of the airbag 22 is borne by the floor 20 in the uninflated position and the inflated position. In the uninflated position, the airbag 22 may be concealed from view. For example, as set forth above, the floor 20 includes upholstery and the airbag 22 may be below the upholstery in the uninflated position. When inflated, the airbag 22 may break through the upholstery, e.g., through a tear seam, and extends upwardly through the upholstery into the interior cabin 14. In examples in which the airbag 22 assembly includes the housing, the housing may be fixed to a panel, e.g., a metal panel, of the floor 20, e.g., with fasteners. In other examples, the airbag 22 may be rolled or folded and directly fixed to the floor 20, e.g., with fasteners. In such an example, the airbag 22 may be disposed between a metal panel of the floor 20 and upholstery of the floor 20 and may be directly fixed to the metal panel.

The airbag 22 is inflatable upwardly from the floor 20 between the passenger compartment 16 and the cargo compartment 18. Specifically, the airbag 22 in the inflated position separates the passenger compartment 16 from the cargo compartment 18. In other words, the airbag 22 in the inflated position may retain cargo in the cargo compartment 18 and may prevent passage of cargo from the cargo compartment 18 to the passenger compartment 16 during a vehicle impact.

The airbag 22 is designed to prevent passage of cargo from the cargo compartment 18 to the passenger compartment 16 during a vehicle impact. As an example, an uppermost top 52 of the airbag 22, i.e., the highest surface of the airbag 22, in the inflated position is above an uppermost top 54 of the seatbacks 44 of the rearmost seat 36 of the vehicle 10, i.e., the highest surface of the seatback 44. In the example shown in the Figures airbag 22 in the inflated position is above the uppermost top 54 of the seatback 44 of the rear seat 36 at the rearmost row 32. The uppermost top 52 of the airbag 22 may be spaced from the ceiling 40, i.e., below the ceiling 40, as shown in the example in the Figures, or may abut the ceiling 40 in the inflated position. In the example shown in the Figures, the space between the uppermost top 52 of the airbag 22 and the ceiling 40 is sized to retain cargo in the cargo compartment 18 during vehicle impact.

The airbag 22 may be C-shaped to wrap around a portion of the cargo compartment 18 to increase the likelihood of retaining cargo in the cargo compartment 18 during vehicle impact. For example, in the inflated position, the airbag 22 includes a left side 56, a right side 58, and a middle portion 60 between the left side 56 and the right side 58. The middle portion 60 is elongated cross-vehicle 10. The left side 56 and the right side 58 extend vehicle-rearward from the middle portion 60. During inflation, the left side 56 and the right side 58 may assist in retaining cargo in the cargo compartment 18. For example the left side 56 and the right side 58 may assist in containing cargo against the middle portion 60 and may resist movement of the cargo outboard of the middle portion 60 during vehicle impact.

In some examples, the airbag 22 may include one or more extensions 64 extending vehicle-forward above the seatback 44 to control the kinematics of the head of an occupant of the seat 34, i.e., of the rear seat 36 of the rearmost row 32. In the example shown in the Figures, the airbag 22 includes three extensions 64, i.e., one for each occupant-seating area 48 of the rear seat 36 of the rearmost row 32. The airbag 22, specifically, includes a forward-facing panel 66 and the extension 64 extends vehicle-forward of the forward-facing panel 66. The forward-facing panel 66 may abut the back 30 of the rear seat 36 of the rearmost row 32 when inflated. The forward-facing panel 66 may be generally planar in a generally vertical, cross-vehicle plane.

The airbag 22 may be fabric, e.g., a woven polymer yarn. The woven polymer yarn may be, for example, nylon 6, 6. Other examples of the woven polymer yarn include polyether ether ketone (PEEK), polyetherketoneketone (PEKK), polyester, etc. The woven polymer yarn may include a coating, such as silicone, neoprene, urethane, etc. For example, the coating may be polyorgano siloxane.

The inflator 50 is in fluid communication with the airbag 22. The inflator 50 expands the airbag 22 with inflation medium, such as a gas, to move the airbag 22 from the uninflated position to the inflated position. The inflator 50 may be supported by any suitable component. For example, in examples including the housing, the inflator 50 may be supported by the housing. In other examples, the inflator 50 may be supported directly on the floor 20. The inflator 50 may be, for example, a pyrotechnic inflator 50 that ignites a chemical reaction to generate the inflation medium, a stored gas inflator 50 that releases (e.g., by a pyrotechnic valve) stored gas as the inflation medium, or a hybrid. The inflator 50 may be, for example, at least partially in the inflation chamber to deliver inflation medium directly to the inflation chamber or may be connected to the inflation chamber through fill tubes, diffusers, etc.

The vehicle 10 includes at least one retractor 68 that pulls the airbag 22 forward in the inflated position. The retractor 68 is operatively connected to the airbag 22 to pull the airbag 22 upwardly. For example, the vehicle 10 includes a tether 24 extending from the retractor 68 to the airbag 22. The retractor 68 is designed to retract the tether 24 to pull the airbag 22 upward. In the example shown in the Figures, the vehicle 10 includes two retractors 68 and tethers 24. Common numerals are used to identify common features of the retractors 68 and the tethers 24. The vehicle 10 may include any suitable number of retractors 68 and tethers 24, i.e., one or more retractor 68 and tether 24.

The retractor 68 is fixed to the vehicle body 12, and more specifically to the pillar 42. In the example shown in the Figures, the retractors 68 are fixed to the pillars 42 adjacent the seatback 44 of the rearmost row 32. The weight of the retractor 68 is borne by the pillar 42. The retractor 68 may be connected to the pillar 42 with fasteners. The retractor 68 is fixed to the vehicle body 12 above the airbag 22 in the uninflated position. Specifically, the retractor 68 is fixed to the vehicle body 12 above the uppermost top 54 of the seatback 44, e.g., the seatback 44 of the rearmost row 32 in the example shown in the Figures.

The tether 24 has an end connected to the airbag 22 and an end engaged with the retractor 68. The retractor 68 is operatively engaged with the tether 24, e.g., the end of the tether 24, to retract the tether 24. The retractor 68 may be pyrotechnically activated. Specifically, the retractor 68 may include a pyrotechnic charge that is activated to retract the tether 24 onto the retractor 68. The pyrotechnic device may be any suitable type. As one example the retractor 68 may be a rotary actuator, in which the pyrotechnic charge rotates a shaft connected to the tether 24 such that the tether 24 wraps around the shaft. The pyrotechnic charge is combustible to produce a gas. The pyrotechnic charge may be a solid mixture of substances that, when ignited, react to produce the gas. For example, the pyrotechnic charge may be formed of sodium azide (NaNO3), potassium nitrate (KNO3), and silicon dioxide (SiO2), which react to form nitrogen gas (N2). As another example, the retractor 68 may be activated in any suitable way, e.g., may be motorized, magnetically activated, etc.

The tether 24 extends from the retractor 68 to the airbag 22. The tether 24 may be connected to the airbag 22, for example, by stitching, welding, fusing, adhesive, etc., or may be unitary with the airbag 22, e.g., one-piece woven. The tether 24 may be fabric and, in such examples may be of the same type of material as the airbag 22. In other examples, the tether 24 may be a cord, cable, etc., of any suitable material to pull the airbag 22 upwardly as described herein. The tether 24 is engaged with the retractor 68 in any suitable manner so that the retractor 68 retracts the tether 24 as described herein.

The tether 24 may be concealed by upholstery on the pillar 42, e.g., a trim cover. In such an example, the trim cover may be unseated by the tether 24 and/or may have a tear seam that is broken by the tether 24 when the retractor 68 pulls the tether 24.

In operation, the airbag 22 is inflated, i.e., the inflator 50 is activated, and the retractors 68 are activated in response to a vehicle impact. As the airbag 22 inflates or as the airbag 22 is inflating, the retractors 68 via the tethers 24 pull the airbag 22 upwardly so that the airbag 22 separates the cargo compartment 18 from the passenger compartment 16. When the airbag 22 is inflated and the tethers 24 are retracted upwardly, the tethers 24 may assist in retaining cargo in the cargo compartment 18 by maintaining the airbag 22 upright between the passenger compartment 16 and the cargo compartment 18.

The vehicle 10 includes at least one protrusion 62 extending upwardly from the floor 20 between the airbag 22 and the cargo compartment 18. The protrusion 62 is designed to prevent cargo from sliding vehicle-forward along the floor 20 over the airbag 22. The protrusion 62 discourages placement of cargo over the airbag 22. Specifically, since the protrusion 62 extends upwardly from the floor 20, the protrusion 62 resists sliding of cargo over the protrusion 62 and the airbag 22, i.e., by human force during loading and/or shifting during driving of the vehicle 10. The protrusion 62 may include visual indicia, including text and/or symbols, instructing against the placement of cargo on the protrusion 62 and airbag 22.

As set forth above, the protrusion 62 is between the airbag 22, i.e., in the uninflated position, and the cargo compartment 18. Specifically, the airbag 22 is between the back 30 of the rear seat 36 of the rearmost row 32 and the protrusion 62.

The protrusion 62 may be separate from and assembled to the floor 20, e.g., connected to the floor 20 panel and floor 20 upholstery. As another example, the protrusion 62 may be unitary with the floor 20, i.e., one piece with the floor 20 panel, floor 20 upholstery, etc., in which case the protrusion 62 extends upwardly from the rest of the floor 20. In the example shown in the Figures, the protrusion 62 is separate from the floor 20 and assembled to the floor 20, e.g., with fasteners that fix the protrusion 62 to the floor 20.

The protrusion 62 is elongated cross-vehicle. Specifically, the cross-vehicle length of the protrusion 62 may be the same as the cross-vehicle length of the middle portion 60 of the airbag 22. Accordingly, the right side 58 and the left side 56 of the airbag 22 may extend vehicle-rearward of the protrusion 62 in the inflated position. In some examples, the right side 58 and the left side 56 of the airbag 22 may extend vehicle-rearward of the protrusion 62 in the uninflated position, as shown in the example in the Figures. The protrusion 62 may be one single protrusion 62 elongated cross-vehicle continuously from one end of the protrusion 62 to the other end of the protrusion 62. In another example, the vehicle 10 may include a plurality of protrusions 62 spaced from each other cross-vehicle.

The protrusion 62 is sized so that the airbag 22 extends above the protrusion 62 in the inflated position. The protrusion 62 may, for example, extend 4-5 inches above the floor 20.

The protrusion 62 may be a different type of material or the same type of material as the floor 20. For example, the protrusion 62 may be plastic, vinyl, rubber, etc.

The vehicle 10 includes a computer (not shown) having a processor and a memory storing instructions executable by the processor to deploy the airbag 22 and to activate the retractor 68. The computer is programmed to perform the function described herein. The computer may be, for example, a restraints control module. Use of "in response to," "based on," and "upon determining" herein indicates a causal relationship, not merely a temporal relationship.

The vehicle 10 may include at least one impact sensor (not shown) for sensing impact of the vehicle 10. The impact sensor may be configured to sense impact with a pedestrian. Alternatively or additionally, the sensor may be configured to sense a pedestrian pre-impact. The impact sensor may be configured to sense conditions of the vehicle 10. The impact sensor may, for example, be further defined as a plurality of impact sensors of the same or of different types. For example, the plurality of impact sensors may include a remote object sensor coupled to a controller to generate an object signal in the presence of an object, e.g., a pedestrian, within a field of view. The remote object sensor may include one or more types of sensors including radar, lidar, and/or a vision system. The vision system may include one or more cameras, CCD image sensors, and/or CMOS image sensors, etc. The remote object sensor is configured to sense the presence and the distance of an object from the vehicle 10 and may determine characteristics of the detected objects, such as, radar reflective properties, the area, height, and/or width of the object.

The computer is an example storage medium. Storage medium may be any non-transitory computer-readable storage medium or machine-readable storage medium, such as an optical, magnetic or semiconductor storage medium. In various implementations, storage medium may be an article of manufacture. In some implementations, storage medium may store computer-executable instructions, such as computer-executable instructions to implement logic flow. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some implementations, the circuitry may be implemented in, or functions associated with the circuitry may be implemented by, one or more software or firmware modules. In some implementations, circuitry may include logic, at least partially operable in hardware.

The vehicle 10 includes a communication network that can include a bus in the vehicle 10 such as a controller area network (CAN) or the like, and/or other wired and/or wireless mechanisms. Via the communication network, the computer may transmit messages to various devices in the vehicle 10 and/or receive messages (e.g., CAN messages) from the various devices, e.g., sensors, an actuator, a human machine interface (HMI), etc. Alternatively or additionally, in cases where the computer includes a plurality of devices, the vehicle 10 communication network may be used for communications between devices represented as the computer in this disclosure. Further, as mentioned below, various controllers and/or sensors may provide data to the computer via the vehicle 10 communication network.

The computer is in communication with the impact sensor, the inflator 50, and the retractor 68 for activating the inflator 50 to inflate the airbag 22 and activating the retractor 68 to pull the airbag 22 upwardly. For example, the computer may provide an impulse to the pyrotechnic charge of the inflator 50 and the pyrotechnic charge of the retractor 68 when the impact sensor senses an impact between the vehicle 10 and a pedestrian.

What is claimed is:

1. A vehicle comprising:
    a vehicle body defining an interior cabin, the interior cabin including a passenger compartment and a cargo compartment;
    the vehicle body including a floor below the interior cabin;
    an airbag supported on the floor and inflatable upwardly from the floor between the passenger compartment and the cargo compartment;
    a retractor fixed to the vehicle body above the airbag; and
    a tether extending from the retractor to the airbag.

2. The vehicle as set forth in claim 1, further comprising a protrusion extending upwardly from the floor between the airbag and the cargo compartment.

3. The vehicle as set forth in claim 2, wherein the protrusion is elongated cross-vehicle.

4. The vehicle as set forth in claim 2, further comprising a seat having a back facing vehicle-rearward, the airbag being between the back of the seat and the protrusion.

5. The vehicle as set forth in claim 2, wherein the protrusion is designed to prevent cargo from sliding vehicle-forward along the floor over the airbag.

6. The vehicle as set forth in claim 2, wherein the airbag extends above the protrusion in the inflated position.

7. The vehicle as set forth in claim 1, further comprising a seat having a seatback, the retractor being fixed to the vehicle body above an uppermost top of the seatback.

8. The vehicle as set forth in claim 7, wherein the vehicle body includes a pillar adjacent the seat, the retractor being fixed to the pillar.

9. The vehicle as set forth in claim 7, wherein the seat is elongated cross-vehicle and includes a plurality of occupant-seating areas.

10. The vehicle as set forth in claim 1, further comprising a seat having a seatback, an uppermost top of the airbag in the inflated position being above an uppermost top of the seatback.

11. The vehicle as set forth in claim 1, wherein the vehicle body includes a pillar and the retractor is fixed to the pillar.

12. The vehicle as set forth in claim 1, wherein the airbag includes a left side, a right side, and a middle portion between the left side and the right side, the middle portion being elongated cross-vehicle and the left side and the right side extending vehicle-rearward from the middle portion.

13. The vehicle as set forth in claim 1, wherein the floor includes upholstery and the airbag in an uninflated position is below the upholstery.

14. A vehicle comprising:
    a vehicle body defining an interior cabin, the interior cabin including a passenger compartment and a cargo compartment;
    the vehicle body including a floor below the interior cabin;
    an airbag on the floor and inflatable upwardly from the floor between the passenger compartment and the cargo compartment; and
    a retractor fixed to the vehicle body above the airbag and operatively connected to the airbag to pull the airbag upwardly.

15. The vehicle as set forth in claim 14, further comprising a protrusion extending upwardly from the floor between the airbag and the cargo compartment.

16. The vehicle as set forth in claim 15, wherein the protrusion is elongated cross-vehicle.

* * * * *